(12) United States Patent
Watanabe

(10) Patent No.: US 12,468,233 B2
(45) Date of Patent: Nov. 11, 2025

(54) CONTROL APPARATUS, SYSTEM, LITHOGRAPHY APPARATUS, ARTICLE MANUFACTURING METHOD, CONTROL METHOD, AND NON-TRANSITORY STORAGE MEDIUM

(71) Applicant: CANON KABUSHIKI KAISHA, Tokyo (JP)

(72) Inventor: Yasuhiro Watanabe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 18/324,244

(22) Filed: May 26, 2023

(65) Prior Publication Data
US 2023/0296988 A1 Sep. 21, 2023

Related U.S. Application Data

(63) Continuation of application No. PCT/JP2021/041705, filed on Nov. 12, 2021.

(30) Foreign Application Priority Data

Jan. 13, 2021 (JP) .............................. 2021-003724

(51) Int. Cl.
G03F 7/00 (2006.01)
(52) U.S. Cl.
CPC ...... *G03F 7/70508* (2013.01); *G03F 7/70533* (2013.01)
(58) Field of Classification Search
CPC .... G03F 7/70508; G03F 7/70533; G03F 7/70; G03F 7/70483–70541; G03F 7/20;
(Continued)

(56) References Cited

U.S. PATENT DOCUMENTS 5,943,315 A * 8/1999 Iwasawa ............... G08C 15/00
370/242
6,871,112 B1 * 3/2005 Coss, Jr. ............... H01L 22/20
702/182
(Continued)

FOREIGN PATENT DOCUMENTS

CN 101923348 A 12/2010
CN 109245979 A * 1/2019 ........... H04L 12/403
(Continued)

OTHER PUBLICATIONS

English translation of CN109245979, published Jan. 18, 2019. (Year: 2019).*

(Continued)

*Primary Examiner* — Christina A Riddle
(74) *Attorney, Agent, or Firm* — ROSSI, KIMMS & McDOWELL LLP

(57) ABSTRACT

There is provided a control apparatus for controlling a controlled apparatus connected via a network, including a generation unit configured to generate instruction data for controlling the controlled apparatus, a communication unit configured to transmit/receive, in every predetermined cycle, via the network, a data frame including one of the instruction data generated by the generation unit and response data from the controlled apparatus, and a processing unit configured to acquire, in a case where the response data indicates an abnormality of a unit controlled by the controlled apparatus, abnormality data that is divided and included in a plurality of data frames received by the communication unit and indicates information concerning the abnormality of the unit, and output the abnormality data.

15 Claims, 6 Drawing Sheets

(58) Field of Classification Search
CPC ............ G03F 7/70641; G05B 19/0428; G05B 19/418; G05B 2219/2231; G05B 23/02; G05B 23/0213; G05B 19/05; G05B 23/0267; G05B 19/042; H04L 12/40019; H04L 12/403; H04L 43/0817; H04L 41/0686; H04L 2012/4026; H04L 12/28; H04L 12/40169; H04L 2001/125; H04L 41/06; H04L 67/1095; H04L 67/12; H04L 69/329; H04L 12/40058; H04L 12/40097; H04L 47/28; H04L 47/36; H04L 67/125; H04L 67/34; Y02P 90/02; G06F 13/38; G06F 13/42; G06F 11/0721; G06F 11/0757; G06F 11/0772; G06F 11/0793; G06F 11/0796; G06F 13/00; G06F 13/10; G06F 13/36; G06F 13/362; G02B 21/0016; G02B 21/244; G02B 21/245; G02B 21/36; G03B 13/36; H01L 21/02; H04N 23/67
USPC ..... 355/18, 30, 52–55, 67–77; 370/464–545, 370/241–253
See application file for complete search history.

(56) References Cited

U.S. PATENT DOCUMENTS

| | | |
|---|---|---|
| 10,524,219 B2 | 12/2019 | Ito |
| 11,036,402 B2 | 6/2021 | Nakajima et al. |
| 2007/0129824 A1* | 6/2007 | Sato ........................ G06F 13/30 700/56 |
| 2019/0059065 A1 | 2/2019 | Ito |
| 2019/0208108 A1 | 7/2019 | Gutman et al. |
| 2020/0036786 A1* | 1/2020 | Yoneda .................. H04L 67/12 |
| 2020/0183336 A1 | 6/2020 | Sawada et al. |
| 2020/0210362 A1 | 7/2020 | Nishimura et al. |
| 2020/0244381 A1 | 7/2020 | Yoneda et al. |

FOREIGN PATENT DOCUMENTS

| | | |
|---|---|---|
| CN | 110268348 A | 9/2019 |
| CN | 110609450 A | 12/2019 |
| JP | H09331341 A | 12/1997 |
| JP | 2000331921 A | 11/2000 |
| JP | 2016016198 A | 2/2016 |
| JP | 6192873 B1 | 9/2017 |
| JP | 2019016932 A | 1/2019 |
| KR | 100734531 B1 | 7/2007 |
| KR | 101919744 B1 | 2/2019 |
| TW | 201106369 A | 2/2011 |
| TW | 201737676 A | 10/2017 |
| WO | 2017168723 A1 | 10/2017 |
| WO | 2018070518 A1 | 4/2018 |
| WO | 2018119643 A1 | 7/2018 |

OTHER PUBLICATIONS

International Search Report issued in Intl. Appln. No. PCT/JP2021/041705 mailed Feb. 1, 2022. English translation provided.

Written Opinion issued in Intl. Appln. No. PCT/JP2021/041705 mailed Feb. 1, 2022.

Extended European Search Report issued in European Appln. No. 21919546.8 mailed Aug. 12, 2024.

Wang et al. "Design and Implementation of EtherCAT Master of Gyrowheel under RTX System" Proceedings of the 39th Chinese Control Conference, Jul. 2020, pp. 4515-4520.

Office Action issued in Chinese Appln. No. 202180090248.X mailed Jul. 10, 2025.

* cited by examiner

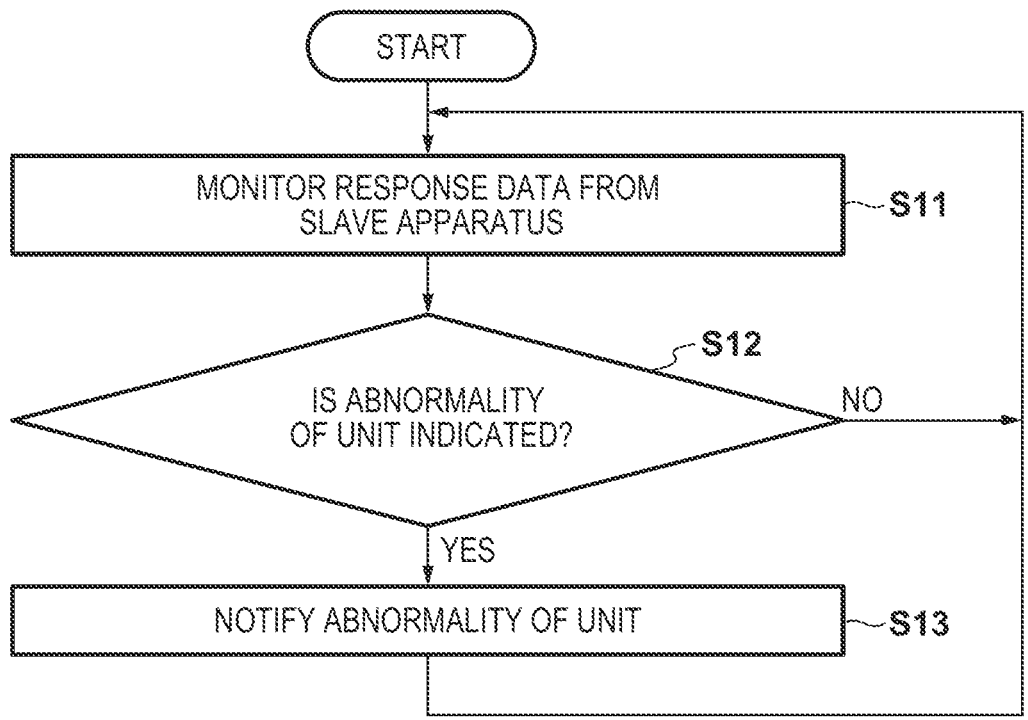
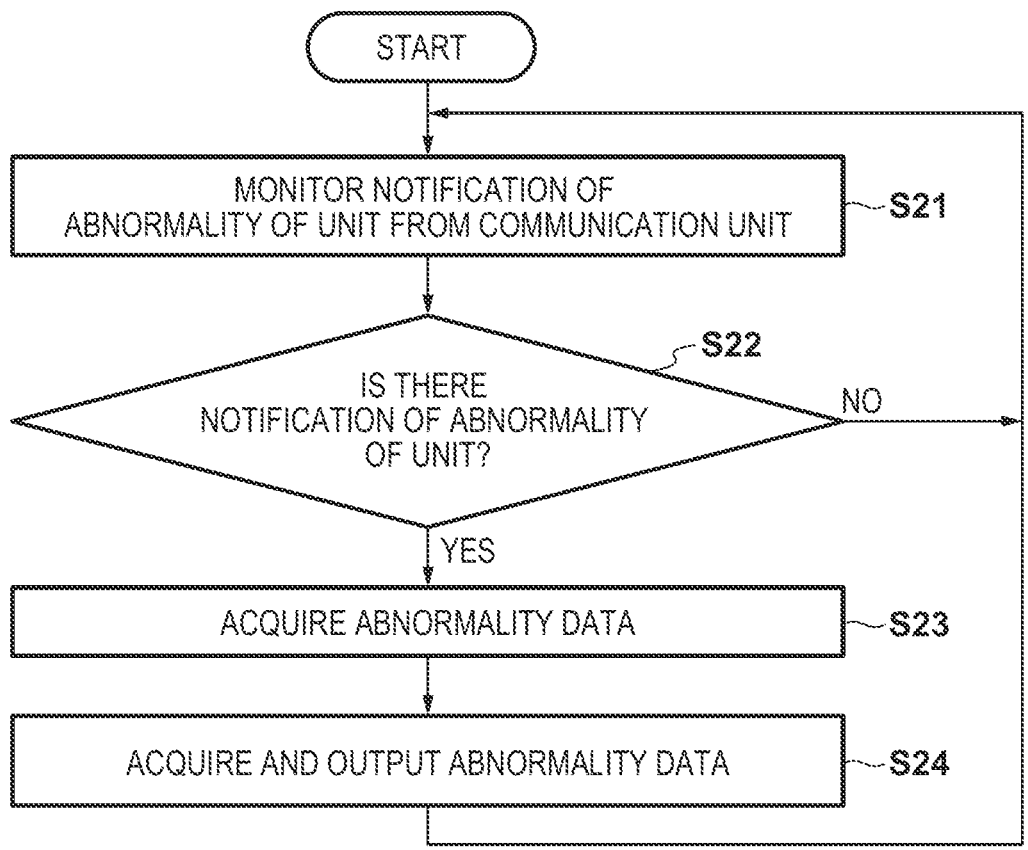

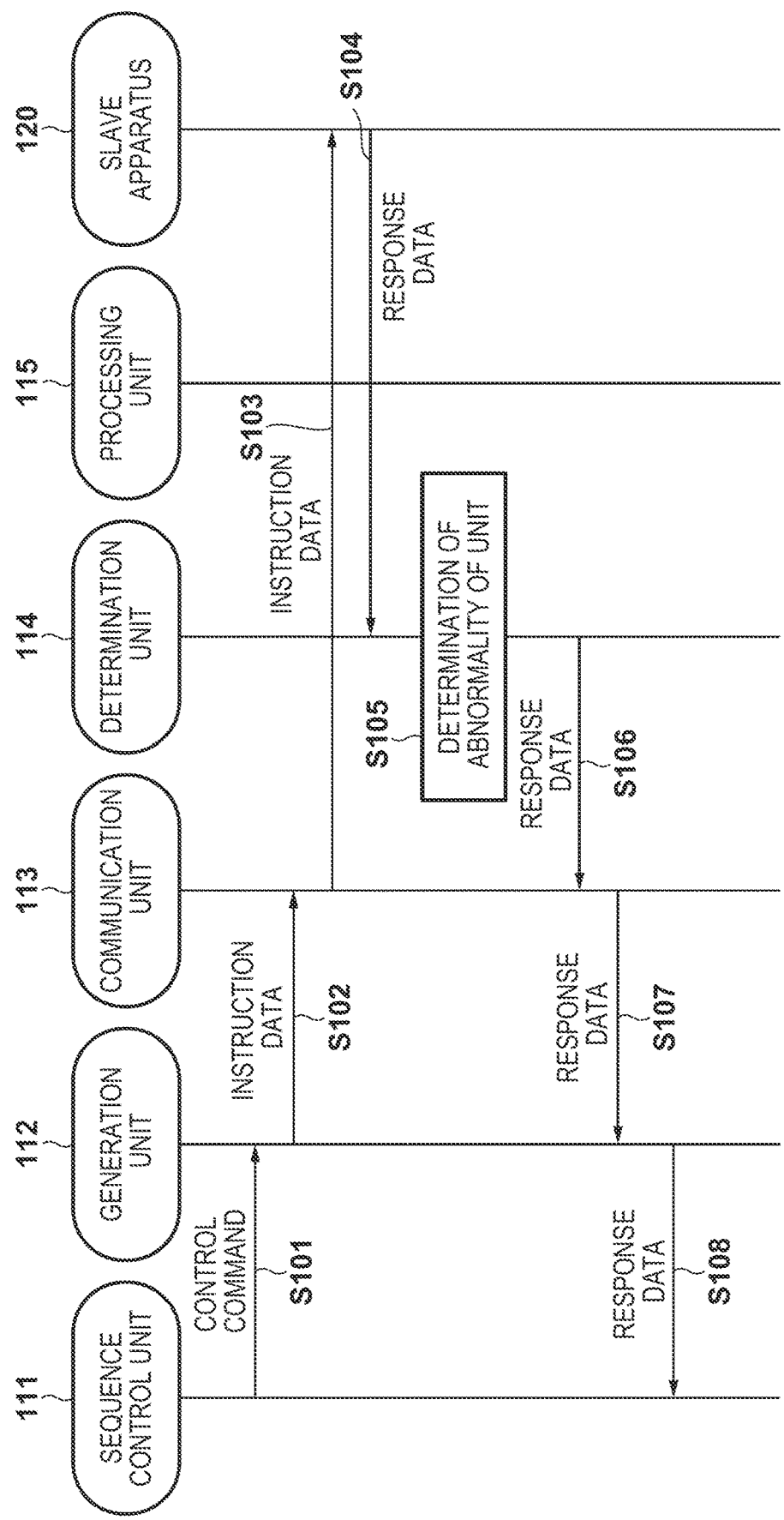

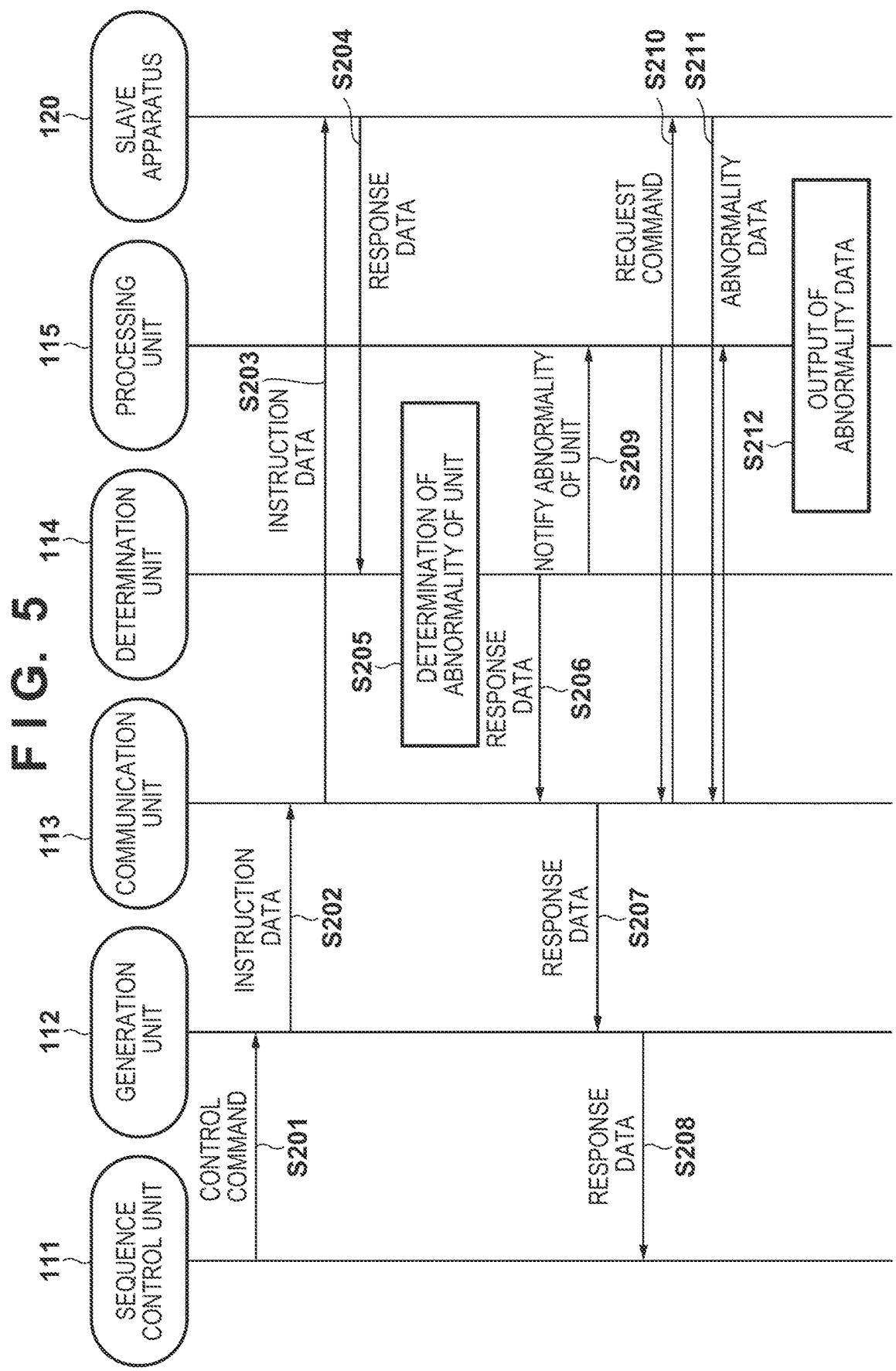

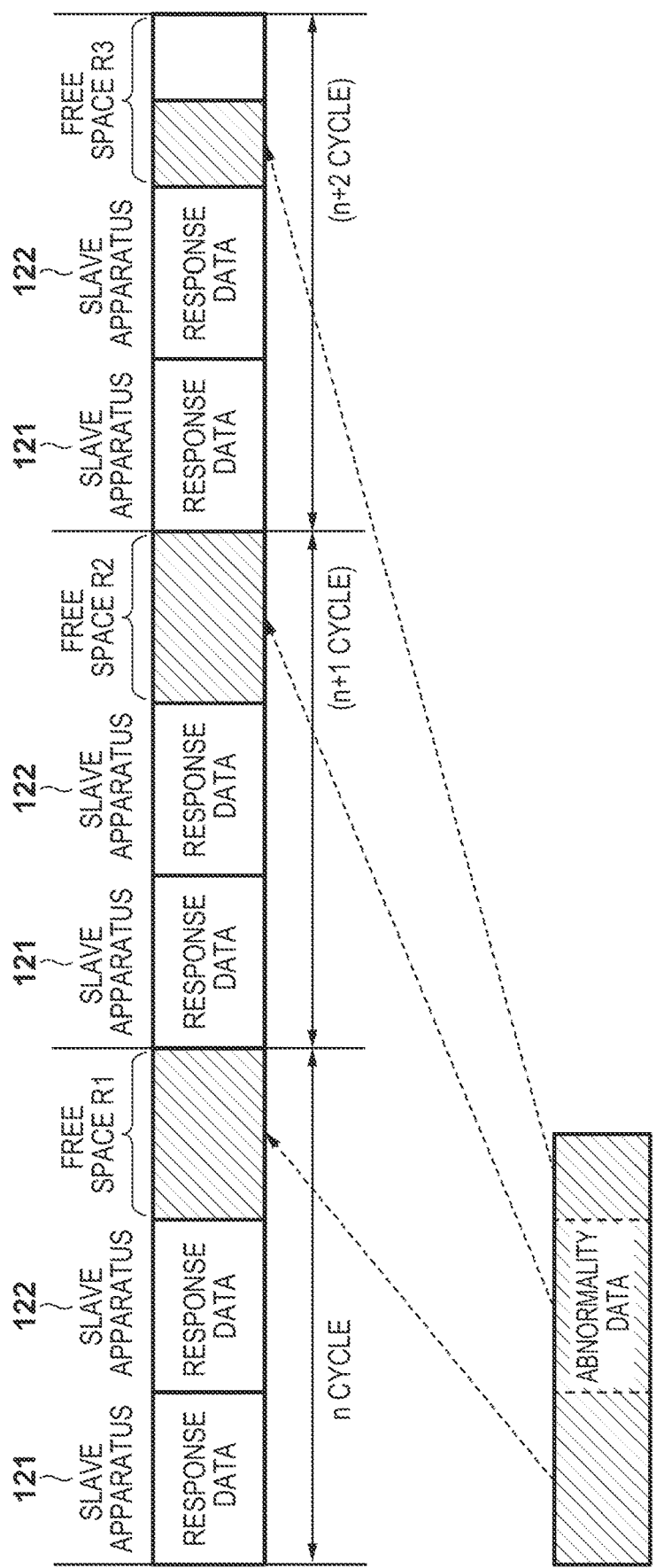

CONTROL APPARATUS, SYSTEM, LITHOGRAPHY APPARATUS, ARTICLE MANUFACTURING METHOD, CONTROL METHOD, AND NON-TRANSITORY STORAGE MEDIUM

CROSS-REFERENCE TO RELATED APPLICATIONS

This application is a Continuation of International Patent Application No. PCT/JP2021/041705, filed Nov. 12, 2021, which claims the benefit of Japanese Patent Application No. 2021-003724, filed Jan. 13, 2021, both of which are hereby incorporated by reference herein in their entirety.

BACKGROUND OF THE INVENTION

Field of the Invention

The present invention relates to a control apparatus, a system, a lithography apparatus, an article manufacturing method, a control method, and a non-transitory storage medium.

Background Art

In a system in which data is transmitted/received between a master apparatus (control apparatus) and a slave apparatus (controlled apparatus) in every predetermined cycle, the master apparatus may need to acquire information from the slave apparatus during the operation of the system. PTL 1 proposes a system for suppressing a decrease in acquisition amount of abnormality detection data while reliably communicating control data between a master apparatus and a slave apparatus regardless of an amount of data communicated (transmitted/received) via a network.

CITATION LIST

Patent Literature

PTL 1: Japanese Patent Laid-Open No. 2019-16932

In a system in which data is transmitted/received between a master apparatus and a slave apparatus in every predetermined cycle, if an abnormality occurs in a unit controlled by the slave apparatus, it is necessary to acquire information concerning the abnormality from the slave apparatus. However, in this case, it is necessary to transmit/receive information (data thereof) concerning the abnormality occurring in the unit between the master apparatus and the slave apparatus in addition to control data, and thus the capacity of data transmitted/received per cycle increases.

If the capacity of data transmitted/received per cycle increases, transmission/reception of the data may not be completed in one cycle (one communication cycle), and the data may be transmitted/received over a plurality of cycles. In this case, processing of the slave apparatus that should be executed in the same cycle is executed over a plurality of cycles, thereby delaying the operation of the system.

The present invention provides a technique advantageous in operating, without delay, a system in which data is transmitted/received between a master apparatus and a slave apparatus.

SUMMARY OF THE INVENTION

A control apparatus as one aspect of the present invention is that a control apparatus for controlling a controlled apparatus connected via a network, including a generation unit configured to generate instruction data for controlling the controlled apparatus, a communication unit configured to transmit/receive, in every predetermined cycle, via the network, a data frame including one of the instruction data generated by the generation unit and response data from the controlled apparatus, and a processing unit configured to acquire, in a case where the response data indicates an abnormality of a unit controlled by the controlled apparatus, abnormality data that is divided and included in a plurality of data frames received by the communication unit and indicates information concerning the abnormality of the unit, and output the abnormality data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a flowchart for explaining processing executed by a determination unit of a master apparatus in the system shown in FIG. 1.

FIG. 3 is a flowchart for explaining processing executed by a processing unit of the master apparatus in the system shown in FIG. 1.

FIG. 4 is a sequence chart for explaining a data flow in the system shown in FIG. 1.

FIG. 5 is a sequence chart for explaining a data flow in the system shown in FIG. 1.

FIG. 6 is a view showing an example of a data frame.

DESCRIPTION OF THE EMBODIMENTS

Figure 1:
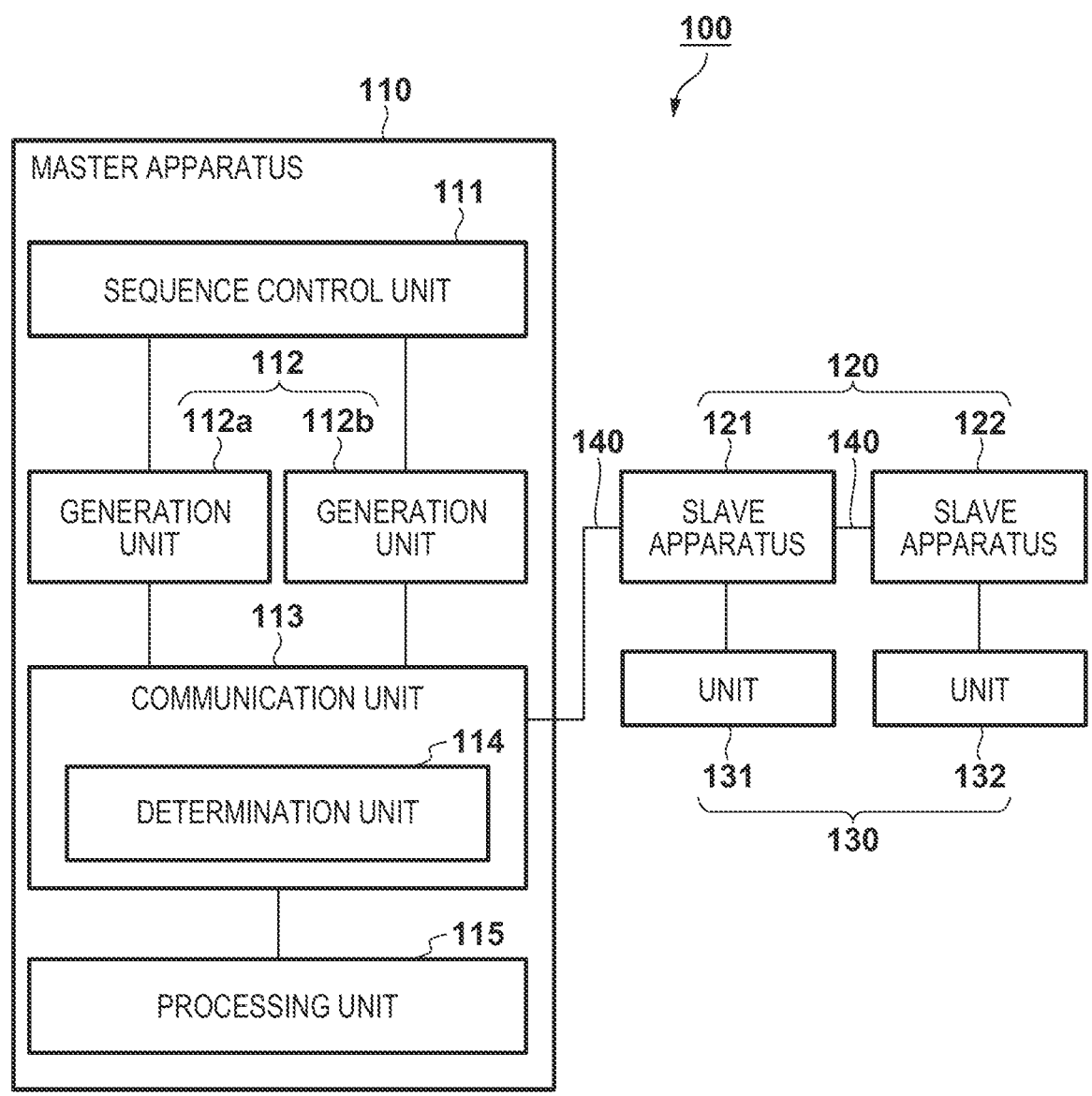
FIG. 1 is a schematic view showing the configuration of a system according to one aspect of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System

FIG. 1 is a schematic view showing the configuration of a system 100 according to one aspect of the present invention. In this embodiment, as shown in FIG. 1, the system 100 includes a master apparatus 110 (control apparatus), a plurality of slave apparatuses 120 (controlled apparatuses) communicably connected to the master apparatus 110, and units 130 respectively connected to the slave apparatuses 120. In the system 100, the master apparatus 110 controls the slave apparatus 120, and each slave apparatus 120 controls the unit 130.

Each of the master apparatus 110 and the slave apparatus 120 is formed by, for example, a computer (information processing apparatus) including a CPU and a memory, but may be formed by a board computer or may be configured to be used as a board computer. Furthermore, each unit 130 includes, for example, a mechanism such as a servo motor.

The plurality of slave apparatuses 120 are communicably connected to the master apparatus 110 by a daisy chain. The master apparatus 110 transmits/receives data to/from the plurality of slave apparatuses 120 via a network 140 in every predetermined cycle. Based on the data received from the master apparatus 110, the plurality of slave apparatuses 120 control the plurality of units 130, respectively.

In this embodiment, two slave apparatuses 121 and 122 are exemplified as the slave apparatuses 120 communicably connected to the master apparatus 110 but the number of slave apparatuses 120 is not limited to two and may be one or three or more. Furthermore, in this embodiment, two units 131 and 132 are exemplified as the units 130 respectively controlled by the slave apparatuses 120. The unit 131 is controlled by the slave apparatus 121 and the unit 132 is controlled by the slave apparatus 122.

As shown in FIG. 1, the master apparatus 110 includes a sequence control unit 111, a plurality of generation units 112, a communication unit 113, a determination unit 114, and a processing unit 115. Note that the communication unit 113 includes the determination unit 114 in this embodiment but the determination unit 114 may be arranged separately from the communication unit 113.

The sequence control unit 111 controls the sequence of processing (for example, processing of controlling the unit 130) by each slave apparatus 120. In this embodiment, the sequence control unit 111 controls the plurality of generation units 112 in accordance with a predetermined (set) sequence, procedure, or recipe.

Each of the plurality of generation units 112 generates instruction data (control data) for controlling the slave apparatus 120, more specifically, instruction data for instructing processing in the slave apparatus 120 as a control target. The generation units 112, the number of which is equal to the number of slave apparatuses 120, are provided in correspondence with the slave apparatuses 120. In this embodiment, two generation units 112a and 112b that set the two slave apparatuses 121 and 122 as control targets, respectively, are provided. The generation unit 112a sets the slave apparatus 121 as a control target, and generates instruction data for controlling processing (for example, processing of controlling the unit 131) in the slave apparatus 121. The generation unit 112b sets the slave apparatus 122 as a control target, and generates instruction data for controlling processing (for example, processing of controlling the unit 132) in the slave apparatus 122.

The communication unit 113 transmits/receives data by communicating with the plurality of slave apparatuses 120 via the network 140 in every predetermined cycle. In this embodiment, the communication unit 113 transmits the instruction data generated by the generation units 112a and 112b to the slave apparatuses 121 and 122 and receives response data to the instruction data from the slave apparatuses 121 and 122, respectively, in every predetermined cycle. The response data is, for example, data indicating that the processing instructed by the instruction data is normally completed. Therefore, if the processing instructed by the instruction data from the master apparatus 110 is not normally completed, for example, if an abnormality occurs in the unit controlled by the slave apparatus 120, the response data includes data indicating the abnormality of the unit 130.

The determination unit 114 determines whether the response data received by the communication unit 113 from the slave apparatus 120 in every predetermined cycle satisfies a predetermined trigger condition, more specifically, whether the response data indicates the abnormality of the unit 130. If it is determined that the response data received by the communication unit 113 indicates the abnormality of the unit 130, the determination unit 114 requests the processing unit 115 to acquire abnormality data indicating information concerning the abnormality of the unit 130 from the slave apparatus 120 and output the abnormality data.

In response to the request from the determination unit 114, the processing unit 115 communicates with the slave apparatus 120 via the communication unit 113. The processing unit 115 acquires, via the communication, the abnormality data indicating the information concerning the abnormality of the unit 130 from the slave apparatus 120, and outputs the abnormality data as a log (that is, outputs the abnormality data to a log file). In this way, if the response data received by the communication unit 113 indicates the abnormality of the unit 130, the processing unit 115 acquires the abnormality data by communicating with the slave apparatus 120 via the communication unit 113, and outputs the abnormality data. In this case, the abnormality data is, for example, data indicating information concerning the state of the unit 130 as the information concerning the abnormality of the unit 130.

As an example of the network 140 shown in FIG. 1, EtherCAT® as one Industrial Ethernet® will be described. In EtherCAT®, a master apparatus connected to the network transmits a data frame to each of a plurality of slave apparatuses, and each of the plurality of slave apparatuses writes, on the fly, data in the data frame received from the master apparatus. At this time, for communication between the master apparatus and the plurality of slave apparatuses, PDO communication and SDO communication are used. PDO communication is a communication method of performing communication in a predetermined cycle using data called a Process Data Object (PDO). SDO communication is a communication method of performing communication in response to a request from the master apparatus using data called a Service Data Object (SDO). In PDO communication, since a data frame is transmitted/received in a predetermined cycle (for example, every 1 msec), the arrival time of the data is ensured. On the other hand, in SDO communication, since communication is not always completed in one cycle, the arrival time of the data is not ensured.

If EtherCAT® is adopted as the network 140, among nodes connected to the network 140, at least one node functions as the master apparatus 110 and the remaining nodes function as the slave apparatuses 120. The node functioning as the master apparatus 110 manages (controls) a timing of transmitting/receiving a data frame in the network 140.

In the system 100 shown in FIG. 1, the master apparatus 110 (communication unit 113) writes the instruction data generated by the generation units 112a and 112b in a data frame of PDO communication, and transmits the data frame to the slave apparatus 121. Upon receiving the data frame from the master apparatus 110, the slave apparatus 121 reads out the instruction data assigned to the slave apparatus 121 from the instruction data written in the data frame, and writes response data to the readout instruction data in the data frame. Then, the slave apparatus 121 transmits, to the slave apparatus 122, the data frame in which the response data to the instruction data assigned to the slave apparatus 121 has been written. Upon receiving the data frame from the slave apparatus 121, the slave apparatus 122 reads out the instruction data assigned to the slave apparatus 122 from the instruction data written in the data frame, and writes response data to the readout instruction data in the data frame. Then, the slave apparatus 122 transmits, to the master apparatus 110 via the slave apparatus 121, the data frame in which the response to the instruction data assigned to the slave apparatus 122 has been written.

More specifically, the slave apparatus 121 reads out the instruction data generated by the generation unit 112a from the data frame received from the master apparatus 110, writes the response data in the data frame, and then transmits the data frame to the slave apparatus 122. The slave apparatus 122 reads out the instruction data generated by the generation unit 112b from the data frame received from the slave apparatus 121, writes the response data in the data frame, and then transmits the data frame to the master apparatus 110 via the slave apparatus 121.

As described above, in the system 100 in which data is transmitted/received between the master apparatus 110 and the slave apparatus 120 in every predetermined cycle, the number of slave apparatuses 120 and the number of units 130 tend to increase due to appearance of a multi-axis articulated industrial robot or the like. In this case, it is necessary to transmit/receive a large capacity of data (instruction data and response data) between the master apparatus 110 and the slave apparatus 120, and thus the capacity of data transmitted/received per cycle increases. Furthermore, if an abnormality occurs in the unit 130 controlled by the slave apparatus 120, it is necessary to transmit/receive abnormality data indicating information concerning the abnormality between the master apparatus 110 and the slave apparatus 120 in addition to the instruction data and the response data. However, in general, the capacity of data transmissible/receivable per cycle is limited. Therefore, if the capacity of data transmitted/received per cycle increases, transmission/reception of the data is not completed in one cycle (one communication cycle), and thus the data is transmitted/received over a plurality of cycles. In this case, the processing of the slave apparatus 120 that should be executed in the same cycle is executed over a plurality of cycles (that is, one instruction data is divisionally transmitted over a plurality of cycles), thereby delaying the operation of the system 100. The delay of the operation of the system 100 becomes significant especially in a case where an abnormality occurs in the unit 130 and it is necessary to transmit abnormality data indicating information concerning the abnormality from the slave apparatus 120 to the master apparatus 110.

To cope with this, this embodiment provides a technique advantageous in operating, without delay, the system 100 in which data is transmitted/received between the master apparatus 110 and the slave apparatus 120 even in a case where an abnormality occurs in the unit 130 controlled by the slave apparatus 120. More specifically, in this embodiment, the communication unit 113 uses PDO communication for communication with the slave apparatus 120, and the processing unit 115 uses SDO communication via the communication unit 113 for communication with the slave apparatus 120.

First, processing executed by the determination unit 114 of the master apparatus 110 in the system 100 according to this embodiment will be described first. FIG. 2 is a flowchart for explaining the processing executed by the determination unit 114. If the user activates the system 100, the master apparatus 110 and the plurality of slave apparatuses 121 and 122 are activated. Then, transmission/reception of data via the network 140 in every predetermined cycle starts between the master apparatus 110 and the plurality of slave apparatuses 121 and 122. This starts the processing shown in FIG. 2 in the determination unit 114.

In step S11, the determination unit 114 monitors (confirms) response data received by the communication unit 113 from the slave apparatus 120. In step S12, the determination unit 114 determines, in the communication cycle (predetermined cycle) of the communication unit 113, whether the response data from the slave apparatus 120 indicates an abnormality of the unit 130. If the response data indicates an abnormality of the unit 130, the process shifts to step S13. On the other hand, if the response data does not indicate an abnormality of the unit 130, the process returns to step S11. In step S13, the determination unit 114 notifies the processing unit 115 of the abnormality of the unit 130 using an FIFO queue, and requests the processing unit 115 to acquire abnormality data indicating information concerning the abnormality of the unit 130 from the slave apparatus 120 and output the abnormality data.

Next, processing executed by the processing unit 115 of the master apparatus 110 in the system 100 according to this embodiment will be described. FIG. 3 is a flowchart for explaining the processing executed by the processing unit 115. If the user activates the system 100, the master apparatus 110 and the plurality of slave apparatuses 121 and 122 are activated. Then, transmission/reception of data in every predetermined cycle via the network 140 starts between the master apparatus 110 and the plurality of slave apparatuses 121 and 122. This starts the processing shown in FIG. 3 in the processing unit 115.

In step S21, the processing unit 115 monitors (confirms) a notification of an abnormality of the unit 130 from the determination unit 114. In step S22, the processing unit 115 determines whether a notification of an abnormality of the unit 130 is received from the determination unit 114. If a notification of an abnormality of the unit 130 is received, the process shifts to step S23. On the other hand, if no notification of an abnormality of the unit 130 is received, the process returns to step S21. In step S23, the processing unit 115 acquires, via the communication unit 113, abnormality data indicating information concerning the abnormality of the unit 130 from the slave apparatus 120 that controls the unit 130 in which the abnormality has occurred. In step S24, the processing unit 115 outputs, as a log, the abnormality data acquired in step S23, and returns to step S21.

Note that the communication unit 113 repeatedly transmits/receives data to/from the plurality of slave apparatuses 121 and 122 via the network 140 in every predetermined cycle even while the processing unit 115 executes the processing shown in FIG. 3. At this time, the priority level (execution priority level) of the processing unit 115 is set lower than that of the communication unit 113. Thus, the processing (communication) of the communication unit 113 including the determination unit 114 is preferentially executed over the processing of the processing unit 115. Therefore, the priority level of communication for acquiring the abnormality data by the processing unit 115 is lower than that of communication for transmitting/receiving the instruction data or the response data by the communication unit 113. Furthermore, the determination unit 114 uses the FIFO queue to notify the processing unit 115 of the abnormality of the unit 130. Thus, the processing (step S13) of notifying, by the determination unit 114, the processing unit 115 of the abnormality of the unit 130 and the processing (step S24) of acquiring, by the processing unit 115, the abnormality data from the slave apparatus 120 and outputting the abnormality data can be executed independently of each other. As a result, the processing of acquiring the abnormality data from the slave apparatus 120 and outputting the abnormality data, which is executed by the processing unit 115, does not influence the processing of transmitting/receiving the instruction data or the response data via the network 140 in every predetermined cycle, which is executed by the communication unit 113.

In Examples 1 and 2, a data flow in the system 100 according to this embodiment will be described below. FIGS. 4 and 5 are sequence charts each showing an example of a data flow among the sequence control unit 111, the generation unit 112, the communication unit 113, the determination unit 114, the processing unit 115, and the slave apparatus 120 in the system 100 according to this embodiment. FIG. 4 shows an example (Example 1) of a data flow in a case where the response data from the slave apparatus 120 does not indicate an abnormality of the unit 130. FIG. 5 shows an example (Example 2) of a data flow in a case where the response data from the slave apparatus 120 indicates an abnormality of the unit 130.

Example 1

Referring to FIG. 4, the sequence control unit 111 transmits, to the generation unit 112, a control command to cause the generation unit 112 to generate instruction data in accordance with a predetermined (set) sequence, procedure, or recipe (S101). Upon receiving the control command from the sequence control unit 111, the generation unit 112 generates, based on the control command, instruction data for causing the slave apparatus 120 to execute processing, and transmits the instruction data to the communication unit 113 (S102). Upon receiving the instruction data from the generation unit 112, the communication unit 113 transmits the instruction data to the slave apparatus 120 by writing the instruction data in a data frame of the network 140 (S103). Upon receiving the instruction data from the communication unit 113, the slave apparatus 120 controls the unit 130 by executing the processing instructed by the instruction data. Then, upon completion of the processing instructed by the instruction data, the slave apparatus 120 transmits response data to the determination unit 114 (the communication unit 113) by writing the response data in the data frame of the network 140 (S104).

The determination unit 114 monitors (confirms) the response data received from the slave apparatus 120 in the communication cycle (predetermined cycle) of the communication unit 113. Then, the determination unit 114 determines whether the response data indicates an abnormality of the unit 130 (S105). In Example 1, the response data does not indicate an abnormality of the unit 130, as described above. In this case, the determination unit 114 transmits the response data to the communication unit 113 (S106). Upon receiving the response data from the determination unit 114, the communication unit 113 transmits the response data to the generation unit 112 (S107). Upon receiving the response data from the communication unit 113, the generation unit 112 transmits the response data to the sequence control unit 111 (S108).

Example 2

S201 to S204 shown in FIG. 5 are the same as S101 to S104 shown in FIG. 4, respectively, and a detailed description thereof will be omitted.

The determination unit 114 monitors (confirms) response data received from the slave apparatus 120 in the communication cycle (predetermined cycle) of the communication unit 113. The determination unit 114 determines whether the response data indicates an abnormality of the unit 130 (S205). In Example 2, the response data indicates an abnormality of the unit 130, as described above. In this case, the response data received by the determination unit 114 is transmitted to the sequence control unit 111 via the communication unit 113 and the generation unit 112 (S206, S207, and S208). Note that S206 to S208 shown in FIG. 5 are the same as S106 to S108 shown in FIG. 4, respectively, and a detailed description thereof will be omitted. Furthermore, the determination unit 114 notifies the processing unit 115 that the response data received by the determination unit 114 indicates an abnormality of the unit 130. That is, the determination unit 114 notifies the processing unit 115 of an abnormality of the unit 130. The processing unit 115 transmits, via the communication unit 113, to the slave apparatus 120 that controls the unit 130 in which the abnormality has occurred, instruction data including a request command to request abnormality data indicating information concerning the abnormality of the unit 130 (S210). Then, the processing unit 115 acquires, via the communication unit 113, from the slave apparatus 120 that has received the instruction data including the request command, the abnormality data indicating the information concerning the abnormality of the unit 130 (S211). Furthermore, the processing unit 115 outputs, as a log, the abnormality data acquired from the slave apparatus 120 (S212).

As described above, in this embodiment, if an abnormality occurs in the unit 130, the processing unit 115 acquires abnormality data from the slave apparatus 120 via the communication unit 113, and outputs the abnormality data as a log.

The data frame in which the abnormality data is written will now be described in detail with reference to FIG. 6. FIG. 6 is a view showing an example of the data frame transmitted from the slave apparatus 122 to the communication unit 113 in a case where an abnormality occurs in the unit 132 controlled by the slave apparatus 122.

As shown in FIG. 6, each of the slave apparatuses 121 and 122 writes response data in a data frame of the nth cycle but the data frame includes a free space R1. Each of the slave apparatuses 121 and 122 writes response data in a data frame of the (n+1)th cycle but the data frame includes a free space R2. Similarly, each of the slave apparatuses 121 and 122 writes response data in a data frame of the (n+2)th cycle but the data frame includes a free space R3. In this embodiment, the processing unit 115 transmits a request command to the slave apparatus 120 via the communication unit 113 so that abnormality data indicating information concerning the abnormality of the unit 132 is divided and written in the free spaces R1, R2, and R3. Thus, as shown in FIG. 6, the processing unit 115 acquires, in the nth cycle, part of the abnormality data written in the free space R1 of the data frame of the nth cycle. Furthermore, the processing unit 115 acquires, in the (n+1)th cycle, part of the abnormality data written in the free space R2 of the data frame of the (n+1)th cycle. Similarly, the processing unit 115 acquires, in the (n+2)th cycle, part of the abnormality data written in the free space R3 of the data frame of the (n+2)th cycle. Therefore, the processing unit 115 can acquire the abnormality data indicating the information concerning the abnormality of the unit 132 in a cycle (three cycles) different from the communication cycle (predetermined cycle) of the communication unit 113. In this way, the processing unit 115 transmits, to the slave apparatus 120, a request command to request assignment of the abnormality data to the free spaces of the respective frames based on the data amount of the abnormality data and the free spaces of the respective frames for transmitting/receiving the instruction data or the response data in the predetermined cycle. Then, the processing unit 115 acquires, from the slave apparatus 120 via the communication unit 113, the abnormality data assigned to the free spaces of the respective frames in response to the request command. In this way, the processing unit 115 acquires the abnormality data divided and included in the plurality of data frames received by the communication unit 113.

This can set the priority level of communication for transmitting the abnormality data lower than the priority level of communication for transmitting/receiving the instruction data and the response data. That is, even if it is necessary to transmit/receive the abnormality data between the master apparatus 110 and the slave apparatus 120, data corresponding to the processing of the slave apparatus 120 that should be executed in the same cycle is prevented from being transmitted/received over a plurality of cycles. Therefore, it is possible to avoid delay of the data to be transmitted/received in one cycle (one communication cycle) between the master apparatus 110 and the slave apparatus 120, thereby operating the system 100 without delay.

As described above, according to this embodiment, it is possible to provide a technique advantageous in operating, without delay, the system 100 in which data is transmitted/received between the master apparatus 110 and the slave apparatus 120.

Lithography Apparatus

A lithography apparatus to which the system 100 according to one aspect of the present invention is applied will be described. In this embodiment, an exposure apparatus that exposes a substrate to form a pattern on the substrate will be described as a lithography apparatus applied with the system 100 but the present invention is not limited to this. The system 100 is also applicable to a lithography apparatus such as an imprint apparatus that forms a pattern of an imprint material on a substrate using a mold and a drawing apparatus that forms a pattern on a substrate by irradiating the substrate with a charged particle beam.

Figure 7:
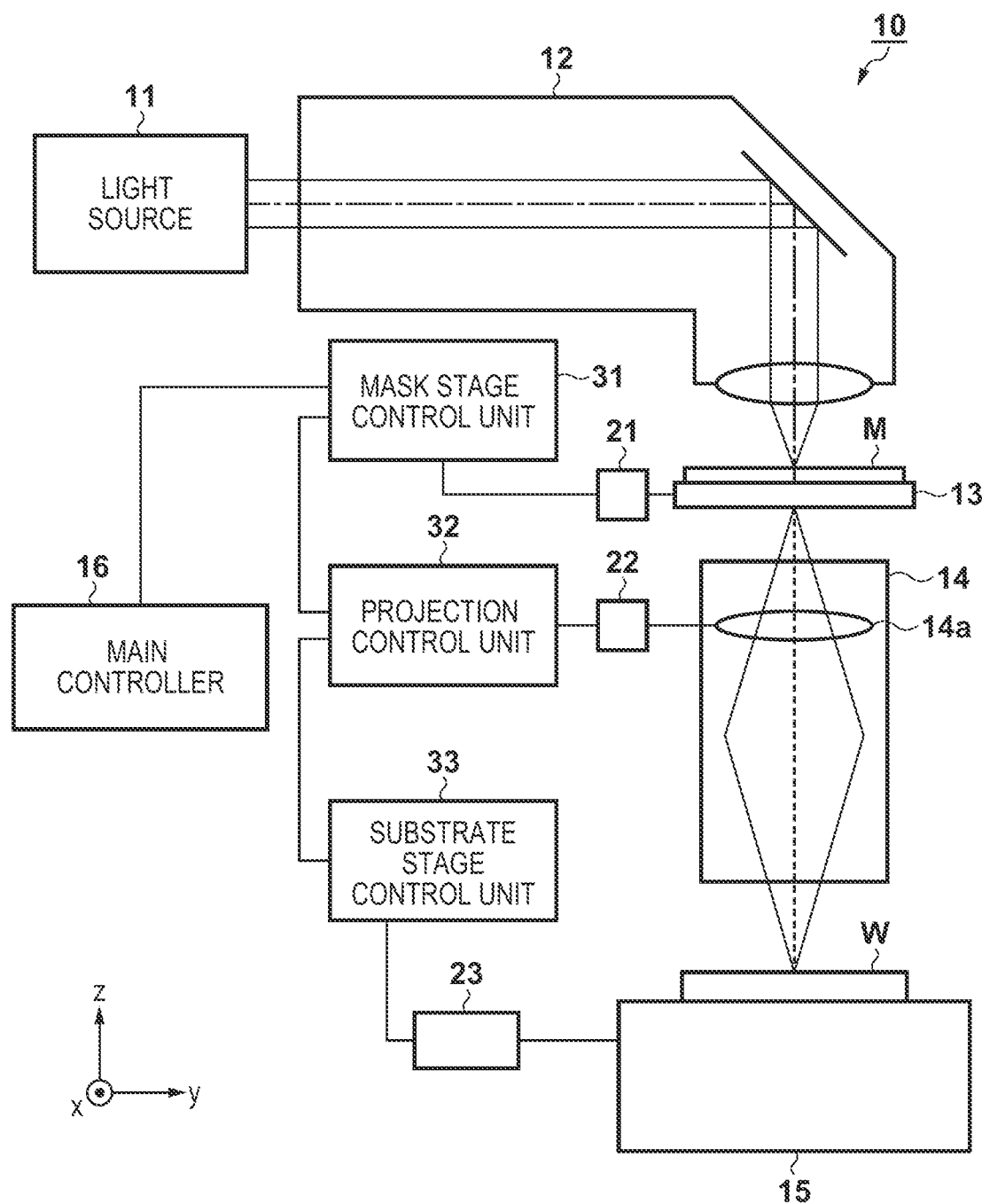
FIG. 7 is a schematic view showing the arrangement of an exposure apparatus according to one aspect of the present invention.

FIG. 7 is a schematic view showing the arrangement of an exposure apparatus 10 according to one aspect of the present invention. The exposure apparatus 10 exposes a substrate W by projecting a pattern of a mask M as an original onto the substrate W via a projection optical system 14. The exposure apparatus 10 includes a light source 11, an illumination optical system 12, a mask stage 13, the projection optical system 14, a substrate stage 15, and a main control unit 16. The exposure apparatus 10 includes a first driving unit 21 that drives the mask stage 13, a second driving unit 22 that drives an optical element 14a of the projection optical system 14, and a third driving unit 23 that drives the substrate stage 15. Furthermore, the exposure apparatus 10 includes a mask stage control unit 31, a projection control unit 32, and a substrate stage control unit 33.

The first driving unit 21, the second driving unit 22, and the third driving unit 23 function as a mechanism that performs at least part of processing of forming the pattern on the substrate W. The first driving unit 21, the second driving unit 22, and the third driving unit 23 are controlled by the mask stage control unit 31, the projection control unit 32, and the substrate stage control unit 33, respectively. Furthermore, the main control unit 16 includes, for example, a CPU and a memory (storage unit), and controls the overall exposure apparatus 10 (each unit of the exposure apparatus 10) by controlling the mask stage control unit 31, the projection control unit 32, and the substrate stage control unit 33.

The light source 11 emits light (exposure light). The illumination optical system 12 illuminates the mask M using the light emitted from the light source 11. The mask stage 13 is a stage that holds the mask M, and is, for example, configured to be movable in the x direction and the y direction by the first driving unit 21. The projection optical system 14 projects, onto the substrate W, the pattern of the mask M illuminated by the illumination optical system 12. The projection optical system 14 includes the optical element 14a that is, for example, movable in the x direction by the second driving unit 22. The substrate stage 15 is a stage that holds the substrate W, and is, for example, configured to be movable in the x direction and the y direction by the third driving unit 23.

If the system 100 is applied to the exposure apparatus 10 shown in FIG. 7, the main control unit 16 is configured as the master apparatus 110, and each of the mask stage control unit 31, the projection control unit 32, and the substrate stage control unit 33 is configured as the slave apparatus 120. Furthermore, each of the first driving unit 21, the second driving unit 22, and the third driving unit 23 is configured as the unit 130. Data is transmitted/received between the main control unit 16 and the mask stage control unit 31, the projection control unit 32, and the substrate stage control unit 33 via the network in every predetermined cycle.

A case where an abnormality occurs in the substrate stage 15 (control thereof) in the exposure apparatus 10 applied with the system 100 will be described. The main control unit 16 functions as the master apparatus 110, as described above, and includes the sequence control unit 111, the plurality of generation units 112, the communication unit 113, the determination unit 114, and the processing unit 115. A trigger condition for determination by the determination unit 114 is an abnormality of the substrate stage 15.

To control the substrate stage 15, in accordance with a predetermined (set) sequence, procedure, or recipe, the sequence control unit 111 transmits, to the generation unit 112, a control command to cause the generation unit 112 to generate instruction data. Upon receiving the control command from the sequence control unit 111, the generation unit 112 generates, based on the control command, instruction data for causing the substrate stage control unit 33 to execute processing, and transmits the instruction data to the communication unit 113. Upon receiving the instruction data from the generation unit 112, the communication unit 113 transmits the instruction data to the substrate stage control unit 33 by writing the instruction data in the data frame of the network 140. Upon receiving the instruction data from the communication unit 113, the substrate stage control unit 33 controls the substrate stage 15 based on the instruction data. If an abnormality occurs in control of the substrate stage 15, the substrate stage control unit 33 transmits response data indicating the abnormality of the substrate stage 15 to the determination unit 114 (communication unit 113) by writing the response data in the data frame of the network 140. Note that the abnormality of the control of the substrate stage 15 includes, for example, a state in which the substrate stage 15 cannot be driven to an instructed position and a state in which the substrate W cannot be chucked.

In this embodiment, the determination unit 114 determines that the response data from the substrate stage control unit 33 indicates the abnormality of the substrate stage 15, and the response data is transmitted to the sequence control unit 111 via the communication unit 113 and the generation unit 112. Upon receiving the response data, the sequence control unit 111 determines that the substrate stage 15 is abnormal. Furthermore, the determination unit 114 notifies the processing unit 115 that the response data received by the determination unit 114 indicates the abnormality of the substrate stage 15. That is, the determination unit 114 notifies the processing unit 115 of the abnormality of the substrate stage 15. The processing unit 115 transmits, via the communication unit 113, to the substrate stage control unit 33 that controls the substrate stage 15, a request command to request abnormality data indicating information concerning the abnormality of the substrate stage 15. Note that the abnormality data includes the state of the substrate stage 15, more specifically, the position, chucking pressure, and the like of the substrate stage 15. Then, the processing unit 115 acquires, via the communication unit 113, the abnormality data indicating the information concerning the abnormality of the substrate stage 15 from the substrate stage control unit 33 that has received the request command. Furthermore, the processing unit 115 outputs, as a log, the abnormality data acquired from the substrate stage control unit 33.

As described above, the exposure apparatus 10 is formed by the plurality of mechanisms, and even if an abnormality occurs in a given mechanism, it may be necessary to continue control of other mechanisms. For example, even if an abnormality occurs in the substrate stage 15, it may be necessary to continue control of the optical element 14a of the projection optical system 14. The exposure apparatus 10 applied with the system 100 executes, via the communication unit 113, the processing of acquiring the abnormality data from the substrate stage control unit 33. Furthermore, the priority level (execution priority level) of communication with the substrate stage control unit 33 by the processing unit 115 is lower than that of communication with the substrate stage control unit 33 by the communication unit 113. As a result, the processing of acquiring the abnormality data from the substrate stage control unit 33 and outputting the abnormality data does not influence control of the optical element 14a of the projection optical system 14, which is executed in every predetermined cycle.

A method of manufacturing an article according to an embodiment of the present invention is suitable for manufacturing an article such as a micro-device such as a semiconductor device or an element having a fine structure. This manufacturing method includes a step of forming a pattern on a substrate by using the above lithography apparatus (exposure apparatus 10), a step of processing the substrate on which the pattern is formed. This manufacturing method can further include other well-known steps (for example, oxidation, film formation, deposition, doping, planarization, etching, resist removal, dicing, bonding, and packaging). When compared to the conventional methods, the method of manufacturing an article according to this embodiment is advantageous in at least one of the performance, quality, productivity, and production cost of an article.

According to the present invention, for example, it is possible to provide a technique advantageous in operating, without delay, a system in which data is transmitted/received between a master apparatus and a slave apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus for controlling a controlled apparatus connected via a network, comprising:
    a generation unit configured to generate instruction data for controlling the controlled apparatus;
    a communication unit configured to transmit/receive, in every predetermined cycle, via the network, a data frame including one of the instruction data generated by the generation unit and response data from the controlled apparatus; and
    a processing unit configured to, after the control apparatus receives, from the controlled apparatus, a first data frame including response data that indicates an abnormality of a unit controlled by the controlled apparatus:
        (i) request, from the controlled apparatus, abnormality data indicating information concerning the abnormality of the unit controlled by the controlled apparatus,
        (ii) acquire the requested abnormality data from the controlled apparatus, the acquired abnormality data being divided and included in a plurality of data frames received by the communication unit and indicating the information concerning the abnormality of the unit indicated by the response data included in the first data frame, and
        (iii) output the acquired abnormality data.

2. The control apparatus according to claim 1, wherein the processing unit acquires the abnormality data included in the plurality of data frames together with the response data.

3. The control apparatus according to claim 1, wherein the processing unit acquires the abnormality data assigned to free spaces of the plurality of data frames.

4. The control apparatus according to claim 1, wherein the processing unit transmits a request command for the abnormality data to the controlled apparatus via the communication unit, and acquires the requested abnormality data via the communication unit.

5. The control apparatus according to claim 1, further comprising:

a determination unit configured to determine whether the response data included in the first data frame indicates the abnormality of the unit, wherein in a case where the determination unit determines that the response data included in the first data frame indicates the abnormality of the unit, the processing unit acquires the abnormality data by communicating with the controlled apparatus via the communication unit.

6. The control apparatus according to claim 1, wherein a priority level of communication with the controlled apparatus, which is executed to acquire the abnormality data, is lower than a priority level of communication with the controlled apparatus, which is executed to transmit/receive one of the instruction data and the response data.

7. The control apparatus according to claim 1, wherein
PDO communication using a process data object is used for communication with the controlled apparatus, which is executed to transmit/receive one of the instruction data and the response data, and SDO communication using a service data object is used for communication with the controlled apparatus, which is executed to acquire the abnormality data.

8. The control apparatus according to claim 1, wherein the acquired abnormality data includes data indicating information concerning a state of the unit.

9. The control apparatus according to claim 1, wherein the controlled apparatus writes the response data in the first data frame on the fly.

10. The control apparatus according to claim 1, wherein the network is a wired network.

11. A system comprising:
a controlled apparatus connected to a network, and
a control apparatus configured to control the controlled apparatus, wherein
the control apparatus includes:
a generation unit configured to generate instruction data for controlling the controlled apparatus,
a communication unit configured to transmit/receive, in every predetermined cycle, via the network, a data frame including one of the instruction data generated by the generation unit and response data from the controlled apparatus, and
a processing unit configured to, after the control apparatus receives, from the controlled apparatus, a first data frame including response data that indicates an abnormality of a unit controlled by the controlled apparatus:
(i) request, from the controlled apparatus, abnormality data indicating information concerning the abnormality of the unit controlled by the controlled apparatus, (ii) acquire the requested abnormality data from the controlled apparatus, the acquired abnormality data being divided and included in a plurality of data frames received by the communication unit and indicating the information concerning the abnormality of the unit indicated by the response data included in the first data frame, and (iii) output the acquired abnormality data.

12. A lithography apparatus for forming a pattern on a substrate, comprising:
the system defined in claim 11,
wherein the unit controlled by the controlled apparatus is configured to execute at least part of processing of forming the pattern on the substrate.

13. An article manufacturing method comprising:
forming a pattern on a substrate by using the lithography apparatus defined in claim 12;
processing the substrate on which the pattern is formed in the forming; and
manufacturing an article from the processed substrate.

14. A control method of controlling, by a control apparatus, a controlled apparatus connected to a network, comprising:
generating instruction data for controlling the controlled apparatus;
transmitting/receiving, in every predetermined cycle, via the network, a data frame including one of the generated instruction data response data from the controlled apparatus;
receiving, from the controlled apparatus, a first data frame including response data that indicates an abnormality of a unit controlled by the controlled apparatus;
requesting, from the controlled apparatus, abnormality data indicating information concerning the abnormality of the unit controlled by the controlled apparatus;
acquiring the requested abnormality data from the controlled apparatus, the acquired abnormality data being divided and included in a plurality of data frames received from the controlled apparatus and indicating the information concerning the abnormality of the unit indicated by the response data included in the first data frame; and
outputting the acquired abnormality data.

15. A non-transitory storage medium storing a program for causing a computer to execute the control method defined in claim 14.

* * * * *